United States Patent
Chen

(10) Patent No.: US 8,436,894 B2
(45) Date of Patent: *May 7, 2013

(54) LIQUID CRYSTAL DISPLAY SYSTEM WHICH ADJUSTS BACKLIGHT TO GENERATE A THREE-DIMENSIONAL IMAGE EFFECT AND METHOD THEREOF

(75) Inventor: Chien-Chou Chen, Taipei County (TW)

(73) Assignee: AmTran Technology Co., Ltd, Jhonghe, Taipei County (TW)

( * ) Notice: Subject to any disclaimer, the term of this patent is extended or adjusted under 35 U.S.C. 154(b) by 446 days.

This patent is subject to a terminal disclaimer.

(21) Appl. No.: 12/830,351

(22) Filed: Jul. 4, 2010

(65) Prior Publication Data

US 2011/0193947 A1 Aug. 11, 2011

(30) Foreign Application Priority Data

Feb. 8, 2010 (TW) .............................. 99103802 A

(51) Int. Cl.
*H04N 13/04* (2006.01)
*H04N 15/00* (2006.01)

(52) U.S. Cl.
USPC ................................................ 348/56; 348/43

(58) Field of Classification Search ............ 348/59, 348/53, 55, 43, 51, 564, 58, 42, 56; 345/102, 345/690, 419, 158; 359/463, 462, 465, 464
See application file for complete search history.

(56) References Cited

U.S. PATENT DOCUMENTS

| | | | |
|---|---|---|---|
| 2008/0186272 A1 * | 8/2008 | Huang et al. | 345/102 |
| 2010/0238274 A1 * | 9/2010 | Kim et al. | 348/51 |
| 2011/0018983 A1 * | 1/2011 | Kim et al. | 348/56 |
| 2011/0102422 A1 * | 5/2011 | Park et al. | 345/419 |

FOREIGN PATENT DOCUMENTS

| | | |
|---|---|---|
| WO | 2009069026 A2 | 6/2009 |
| WO | 2009069026 A3 | 6/2009 |

* cited by examiner

*Primary Examiner* — Behrooz Senfi
(74) *Attorney, Agent, or Firm* — Winston Hsu; Scott Margo

(57) ABSTRACT

When an image frame is generated, a plurality of backlight blocks are driven according to percentage of the image frame being generated, and a left shutter and a right shutter of a pair of shutter glasses are switched according to the time the image frame is generated. In this way, ghost shadows resulting from right eye images or left eye images can be avoided.

15 Claims, 11 Drawing Sheets

LIQUID CRYSTAL DISPLAY SYSTEM WHICH ADJUSTS BACKLIGHT TO GENERATE A THREE-DIMENSIONAL IMAGE EFFECT AND METHOD THEREOF

BACKGROUND OF THE INVENTION

1. Field of the Invention

The present invention relates to a three-dimensional liquid crystal display system and method thereof, and more particularly, to a liquid crystal display system which adjusts a backlight to generate a three-dimensional image effect and method thereof.

2. Description of the Prior Art

In stereoscopic image display technologies, a pair of shutter glasses is usually used with a display for sequentially displaying left eye images and right eye images, so that an observer may perceive three-dimensional images. However, in existing techniques, the observer often sees ghost shadows when the stereoscopic image display transitions from a left eye image to a right eye image. More specifically, such ghost shadows are generated due to the fact that a right eye image displayed on the LCD has not entirely disappeared after a left shutter of the pair of shutter glasses is turned on, whereby the observer sees part of the right eye image in his/her left eye. Such ghost shadows also occur due to the fact that a left eye image displayed on the LCD has not disappeared after a right shutter of the pair of shutter glasses is turned on, whereby the observer sees part of the left eye image in his/her right eye.

In the prior art methods for displaying three-dimensional images, black frame insertion is a technique used to prevent generation of the ghost shadows. Please refer to FIG. 1. FIG. 1 is a diagram illustrating a display method for use in a liquid crystal display (LCD) combined with a pair of shutter glasses 120. As shown in FIG. 1, the LCD sequentially displays frames 102-116. The frames 102-116 include left eye image frames 102, 110, right eye image frames 106, 114, and black frames 104, 108, 112, and 116. In FIG. 1, $t_v$ is a time interval required for the LCD to display one frame. The pair of shutter glasses 120 coordinates with the frames 102-116 shown in FIG. 1 to switch the left shutter and the right shutter. As shown in FIG. 1, when the left eye image frame 102 is displayed, the left shutter is turned on and the right shutter is turned off, so the left eye of the observer may receive the left eye image frame on the LCD; when the right eye image frame 106 is displayed, the left shutter is turned off and the right shutter is turned on, so the right eye of the observer may receive the right eye image frame on the LCD. Similarly, when the left eye image frame 110 is displayed, the left shutter is turned on and the right shutter is turned off; when the right eye image frame 114 is displayed, the left shutter is turned off and the right shutter is turned on. By the shutter glasses 120 switching the left shutter and the right shutter in sync with the frames 102-116, the left eye and the right eye of the observer may respectively receive the left eye image signals and the right eye image signals, so that the observer may perceive a three-dimensional image effect through the frames 102-116. The LCD does not display each image in its entirety at one instant, but instead uses a horizontal scan method, such that images are altered progressively. Therefore, a black frame is inserted between a right eye image frame and a left eye image frame in order to prevent the ghost shadows resulting from right eye images from being received by the left eye of a user, and vision of the user being confused.

However, there are still many disadvantages in the prior art. For example, the prior art of inserting black frames cuts the frame rate experienced by the user to only ¼ of the display frame rate. If the display frame rate is 120 Hz, the display utilizing the black frame insertion can only support display of three-dimensional images at 30 Hz. That is to say, the frames 102 and 110 separated by three frames are left eye image frames and the frames 106 and 114 separated by three frames are right eye image frames.

SUMMARY OF THE INVENTION

An embodiment of the present invention provides a liquid crystal display (LCD) system which adjusts backlight to generate a three-dimensional image effect. The liquid crystal display comprises a three-dimensional video source for outputting a three-dimensional video signal; a backlight module comprising a plurality of backlight blocks for generating backlight; a system control board for generating a first control signal and a second control signal, and for generating a three-dimensional image signal according to the three-dimensional video signal inputted; an LCD driving module coupled to the system control board for adjusting timing on the three-dimensional image signal and outputting an LCD driving signal; an LCD panel installed on a side of the backlight module and coupled to the LCD driving module for receiving the LCD driving signal to generate an image frame; a backlight driving module coupled to the plurality of backlight blocks and the system control board for controlling turning-on and turning-off of corresponding blocks of the plurality of backlight blocks according to the first control signal; and a pair of shutter glasses comprising a left shutter and a right shutter being turned on and turned off according to the second control signal; wherein the first control signal and the second control signal relate to a percentage of the image frame displayed on the LCD panel.

Another embodiment of the present invention provides a method for adjusting backlight to generate a three-dimensional image effect. The method comprises receiving a three-dimensional video signal; generating an image frame on an LCD panel according to the three-dimensional video signal; controlling turning-on and turning-off of corresponding blocks of a plurality of backlight blocks according to a percentage of the image frame displayed on the LCD panel; and controlling turning-on and turning-off of a left shutter and a right shutter of a pair of shutter glasses according to timing of the image frame displayed on the LCD panel; wherein the plurality of backlight blocks are all turned off substantially when the left shutter and the right shutter are switched substantially.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
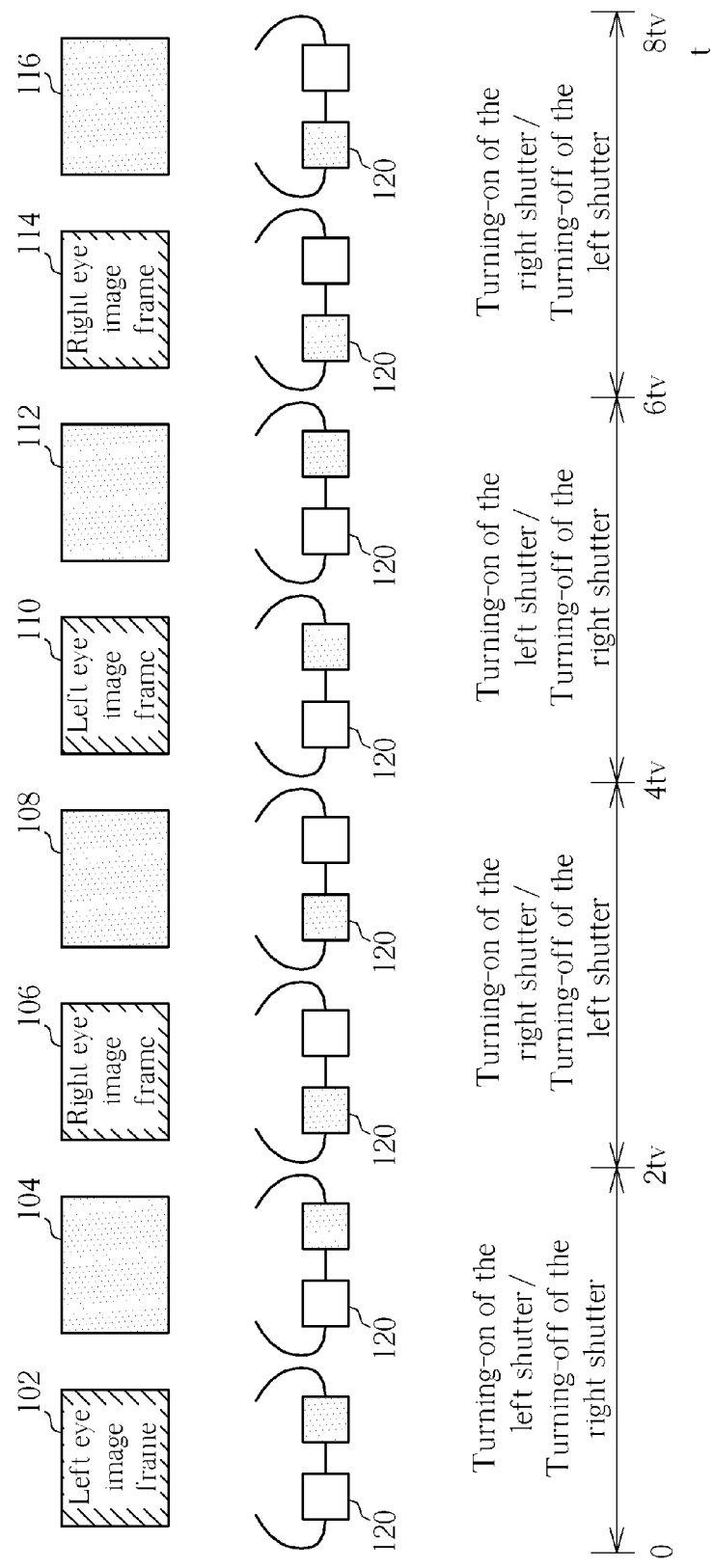
FIG. 1 is a diagram illustrating an LCD combining with a pair of shutter glasses.
Figure 2A:
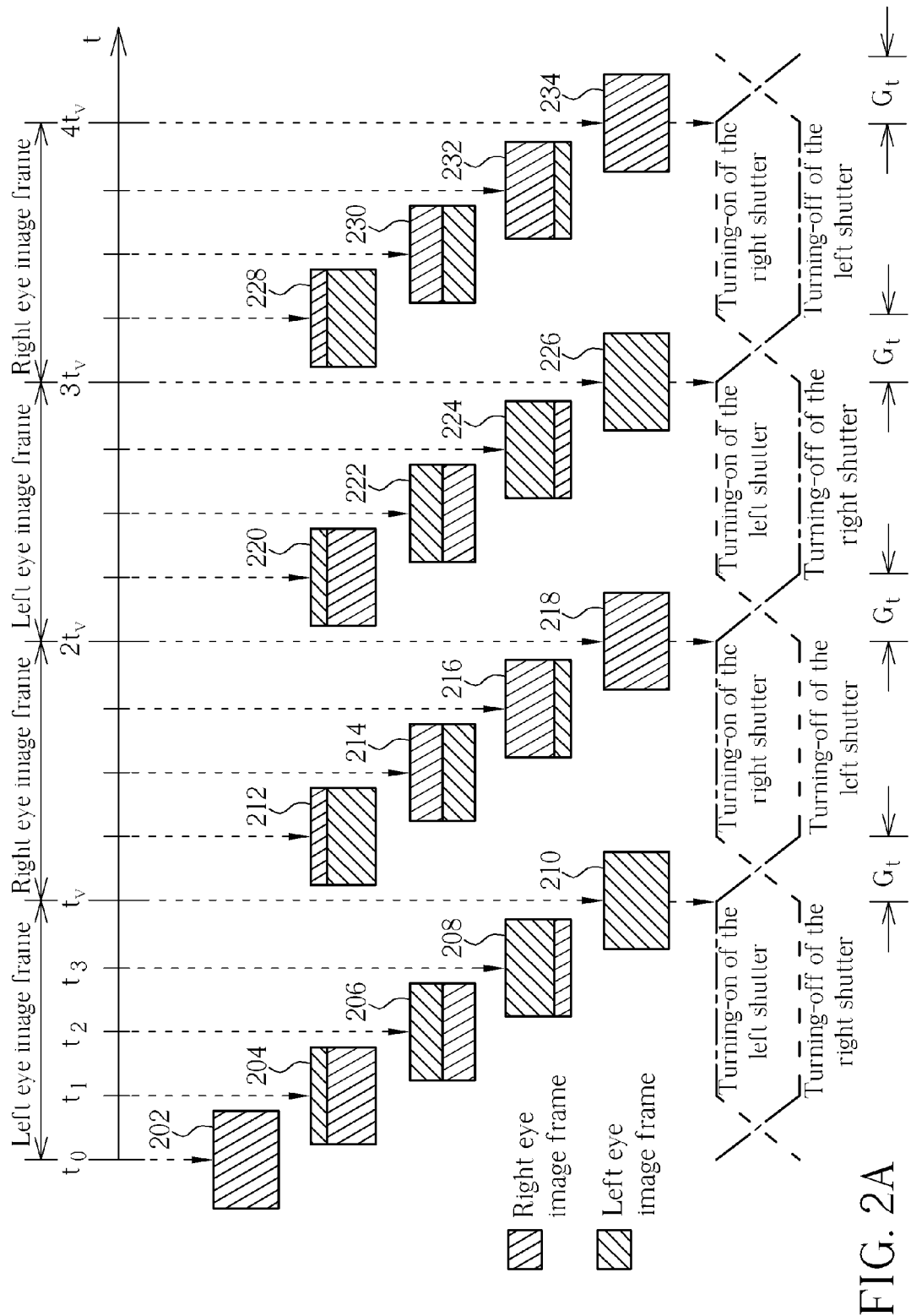
FIG. 2A is a diagram illustrating the timing according to a first embodiment of the present invention. In the timing, the display outputs left eye video signals and right eye video signals and accommodate switching of the shutters of the shutter glasses without black frame insertion.

Please refer to FIG. 2A. FIG. 2A is a diagram illustrating an LCD according to a first embodiment of the present invention. The LCD may work together with switching of shutters of a pair of shutter glasses to display left eye image frames and right eye image frames sequentially. As shown in FIG. 2A, the LCD does not output a black frame when the LCD displays a three-dimensional image. In FIG. 2A, $t_v$ is a time interval required for the LCD to display a frame, which is a reciprocal of a frame rate of the LCD. $G_t$ represents a time interval for switching the shutters of the pair of shutter glasses. For example, if the shutter glasses are configured for liquid crystal technology, $G_t$ may be about 2 ms, and $t_v$ of a 120 Hz display may be about 8 ms, so $G_t$ may equal ¼ of $t_v$.

As shown in FIG. 2A, a time interval $t_0$-$t_v$ may be taken as an example to illustrate a scan process for displaying the left eye image signal on the LCD. At $t=t_0$, the LCD may display a first right eye image frame as shown in frame 202. Then, a progressive scan starts on the LCD to display a first left eye image frame (as shown in frames 202-210). At $t=t_v$, the progressive scan for the first left eye video signal is completed, and the LCD displays the first left eye image frame, as shown in the frame 210.

Then, another progressive scan starts on the LCD to display a second right eye image signal (corresponding to frames 210-218), wherein the frame 218 is the second right eye image frame having been displayed. Then, one more progressive scan starts on the LCD to display a second left eye image signal (corresponding to frames 218-226), wherein the frame 226 is the second left eye image frame having been displayed. Similarly, a third right eye image signal is displayed by a progressive scan (corresponding to frames 226-234), wherein the frame 234 is the third right eye image frame having been displayed.

During a process of scanning frames 204-210 (a time interval of $t_1$-$t_v$), the left shutter of the pair of shutter glasses may be turned on and the right shutter of the pair of shutter glasses may be turned off, but frames 204, 206, and 208 all contain both a part of the left eye image frame and a part of the right eye image frame, so as to cause the left eye of the user to see the part of the right eye image frame and confuse the vision of the user.

Figure 2B:
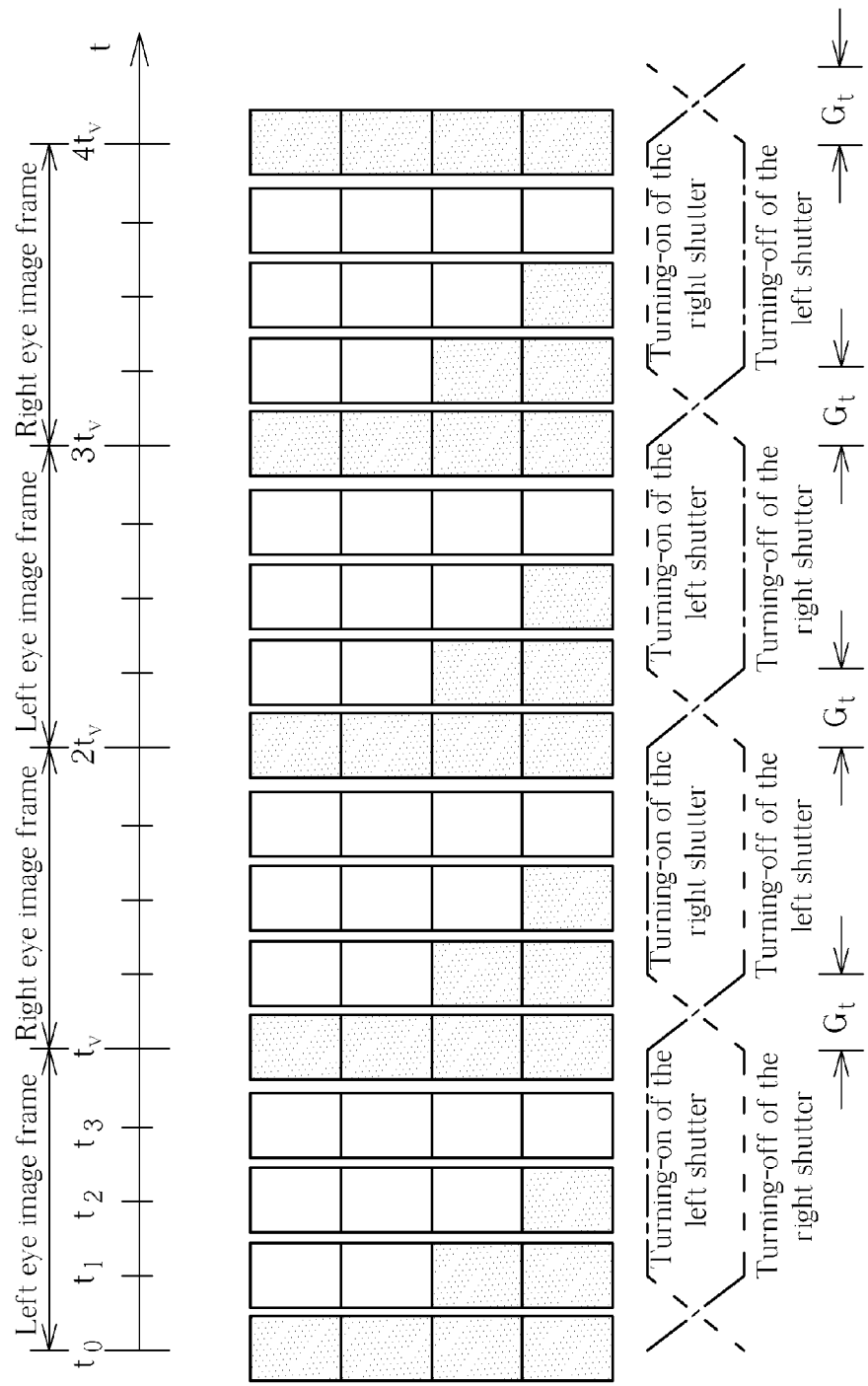
FIG. 2B is a diagram illustrating separate control of the backlight blocks of the backlight module according to FIG. 2A.

Please refer to FIG. 2B. FIG. 2B is a diagram illustrating separate control of backlight blocks of a backlight module according to the embodiment of FIG. 2A. As shown in FIG. 2B, the backlight module of the LCD has 4 backlight blocks which can be controlled respectively. At $t=t_0$, the LCD may substantially turn off all of the backlight blocks; at $t=t_1$, the LCD may only substantially turn on the upper two backlight blocks of the four backlight blocks; at $t=t_2$, the LCD may only substantially turn on the upper three backlight blocks of the four backlight blocks; at $t=t_3$, the LCD may substantially turn on all of the backlight blocks; and, at $t=t_v$, the LCD may substantially turn off all of the backlight blocks. Therefore, during processes of displaying the frames 202-204, 210-212, 218-220, and 226-228, the shutters of the pair of shutter glasses may be switched. By means of substantially turning off all backlight blocks of the backlight module, the images (the right eye image and the left eye image) are prevented from causing interference in the vision of the user. In addition, during processes of displaying frames 210-218, 218-226, and 226-234, the same separate control of the backlight module shown at the time interval of $t_1$-$t_v$ is repeated, so as to prevent the images (the right eye image and the left eye image) from causing interference in the vision of the user.

Figure 3:
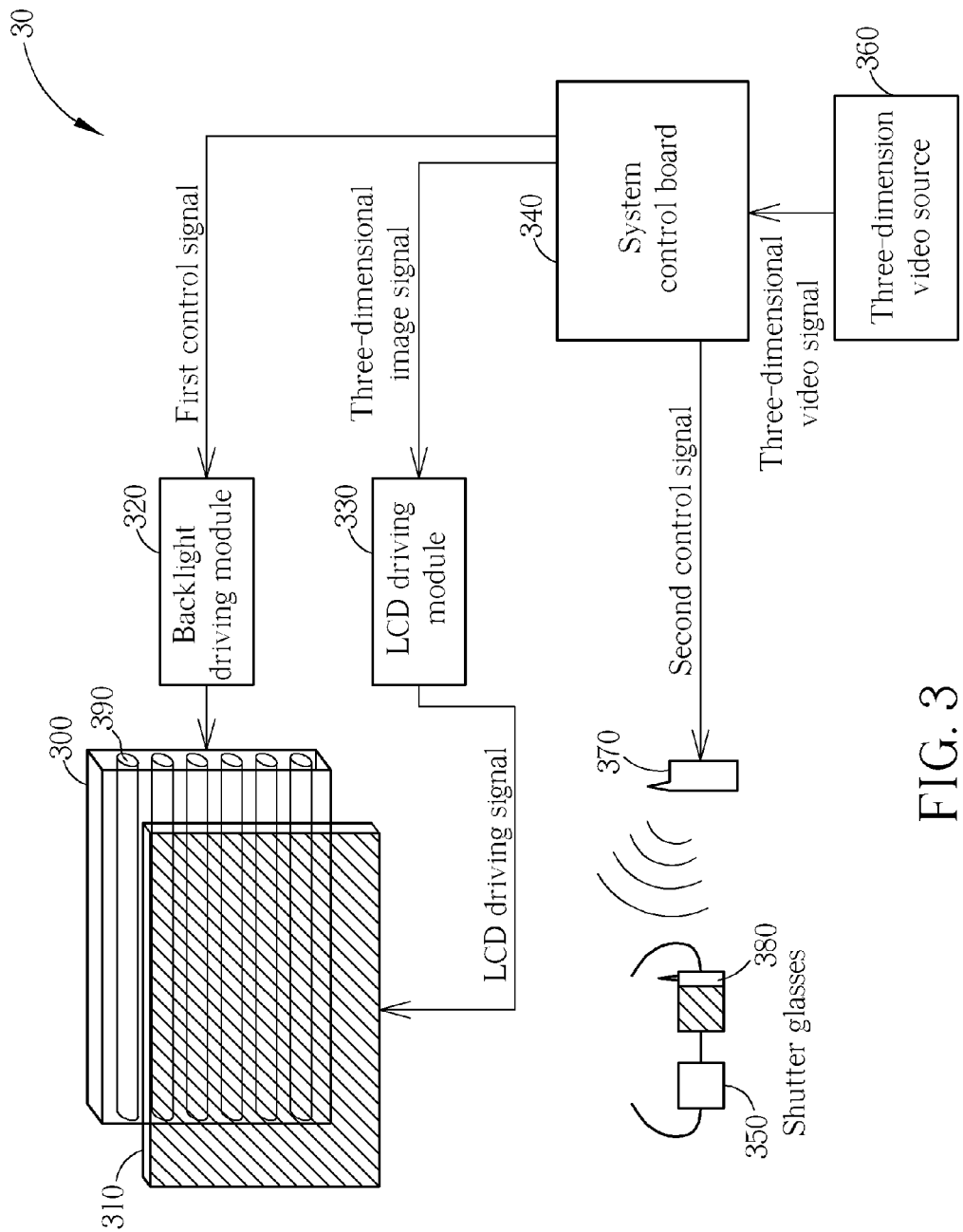
FIG. 3 is a diagram illustrating an LCD system which adjusts backlight to generate a three-dimensional image effect according to an embodiment of the present invention.
Figure 4:
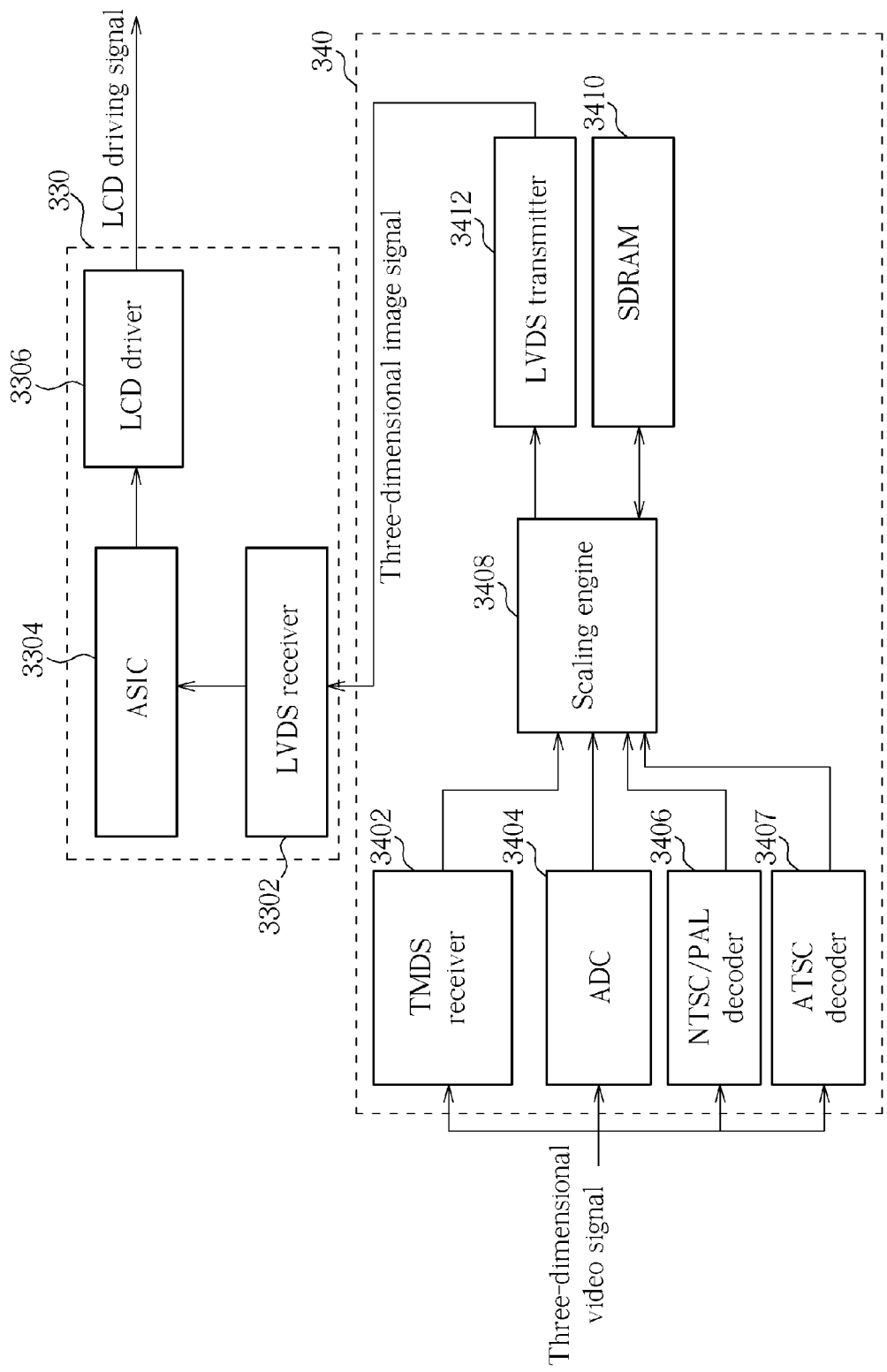
FIG. 4 is a diagram illustrating the system control board and the LCD driving module of the LCD system in FIG. 3.

Please refer to FIG. 3 and FIG. 4. FIG. 3 is a diagram illustrating an LCD system 30 which adjusts a backlight to generate a three-dimensional image effect according to an embodiment of the present invention. The stereoscopic LCD system 30 may comprise a backlight module 300, an LCD panel 310, a backlight driving module 320, an LCD driving module 330, a system control board 340, a pair of shutter glasses 350, a three-dimensional video source 360, a wireless signal transmitter 370 and a wireless signal receiver 380. FIG. 4 is a diagram illustrating the system control board 340 and the LCD driving module 330 of the LCD system 30. The system control board 340 may comprise a transition minimized differential signaling (TMDS) receiver 3402, an analog-to-digital converter (ADC) 3404, a digital/analog tuner 3405, a scaling engine 3408, an SDRAM 3410 and a low-voltage differential signaling (LVDS) transmitter 3412. The digital/analog tuner 3405 may comprise an NTSC/PAL decoder 3406 and an ATSC decoder 3407. The LCD driving module 330 may comprise a LVDS receiver 3302, an application-specific integrated circuit (ASIC) 3304 and an LCD driver 3306.

The three-dimensional video source 360 may output a three-dimensional video signal. The backlight module 300 may comprise a plurality of backlight blocks 390. The backlight module 300 may partially control the plurality of backlight blocks 390. The backlight module 300 may be a light-emitting diode (LED) backlight module or a backlight module with a plurality of cold cathode fluorescent lamps (CCFLs), but the present invention is not limited to the above backlight modules. Any backlight module in which backlight blocks can be partially controlled falls within the scope of the present invention. The system control board 340 may be coupled to the backlight driving module 320 and the LCD driving module 330 for outputting a first control signal to the backlight driving module 320 and a second control signal to the wireless signal transmitter 370.

When the three-dimensional video source 360 transmits the three-dimensional video signal to the system control board 340, the TMDS receiver 3402 in the system control board 340 may receive digital signals of the three-dimensional video signal and transmit audio signals, video signals, and other auxiliary data of the three-dimensional video signal; the ADC 3404 may receive analog RGB primary color signals of the three-dimensional video signal. The scaling engine 3408 may be coupled to the TMDS receiver 3402, the ADC 3404, the NTSC/PAL decoder 3406 and the ATSC decoder 3407 for adjusting the three-dimensional video signal which was adjusted for color, luminance, resolution and/or contrast by the TMDS receiver 3402, the ADC 3404, the NTSC/PAL decoder 3406 and the ATSC decoder 3407. The SDRAM 3410 may be coupled to the scaling engine 3408 for storing the three-dimensional video signal adjusted by the scaling engine 3408. The LVDS transmitter 3412 may be coupled to the scaling engine 3408 and the LCD driving module 330 for transforming the three-dimensional video signal adjusted by the scaling engine 3408 into the three-dimensional image signal, and outputting the three-dimensional image signal to the LCD driving module 330. In addition, the system control board 340 may also have a function of displaying an on-screen display (OSD), which may let a user adjust display range and luminance of the LCD panel 310.

The LCD driving module 330 may be coupled to the LCD panel 310 and the system control board 340. The LVDS receiver 3302 may be coupled to the LVDS transmitter 3412 for receiving the three-dimensional image signal. The application-specific integrated circuit 3304 may be coupled to the LVDS receiver 3302 for adjusting timing of the three-dimensional image signal. The LCD driver 3306 may be coupled to the application-specific integrated circuit 3304 for generating the LCD driving signal according to the three-dimensional image signal having timing adjusted by the application-specific integrated circuit 3304, and outputting the LCD driving signal to the LCD panel 310. The LCD panel 310 may generate a corresponding image frame according to the LCD driving signal from the LCD driving module 330. The backlight driving module 320 may be coupled to the plurality of backlight blocks 390 and the system control board 340 for driving the plurality of backlight blocks 390 gradually according to the first control signal. As shown in FIG. 3, the pair of shutter glasses 350 may receive the second control signal from the wireless signal transmitter 370 through the wireless signal receiver 380, where the wireless signal transmitter 370 may be coupled to the system control board 340. And, the pair of shutter glasses 350 may control turning-on and turning-off of a left shutter and a right shutter according to the second control signal. Wireless transmission between the wireless signal transmitter 370 and the wireless signal receiver 380 may be through a Bluetooth method, a Wi-Fi method, an IR method, or other wireless transmission methods. In addition, the three-dimensional video source 360 may be a computer, a DVD player, or other video sources outputting three-dimensional video signals.

Regarding substantial turning-on and turning-off of the backlight module 300 and the backlight blocks 390 mentioned in the embodiments, substantial turning-off may comprise reducing luminance of the backlight blocks 390 (that is, dimming the luminance of the backlight blocks 390 from bright to dark) and/or turning off the backlight blocks 390 completely; substantial turning-on may comprises boosting the luminance of the backlight blocks 390 (that is, turning the luminance of the backlight blocks 390 up from dark to bright) and/or fully turning on the backlight blocks 390. For example, the backlight module 300 may be the backlight module with the plurality of CCFLs, and the system control board 340 may transmit one or more control signals, such as a Pulse Width Modulation (PWM) signal, for controlling the luminance of the backlight blocks 390 or substantially turning on/off the backlight blocks 390. In addition, the backlight module 300 may also be the backlight module with the plurality of LEDs, and the system control board 340 may transmit one or more control signals for controlling the luminance of the backlight blocks 390 or substantially turning on/off the backlight blocks 390.

Figure 5:
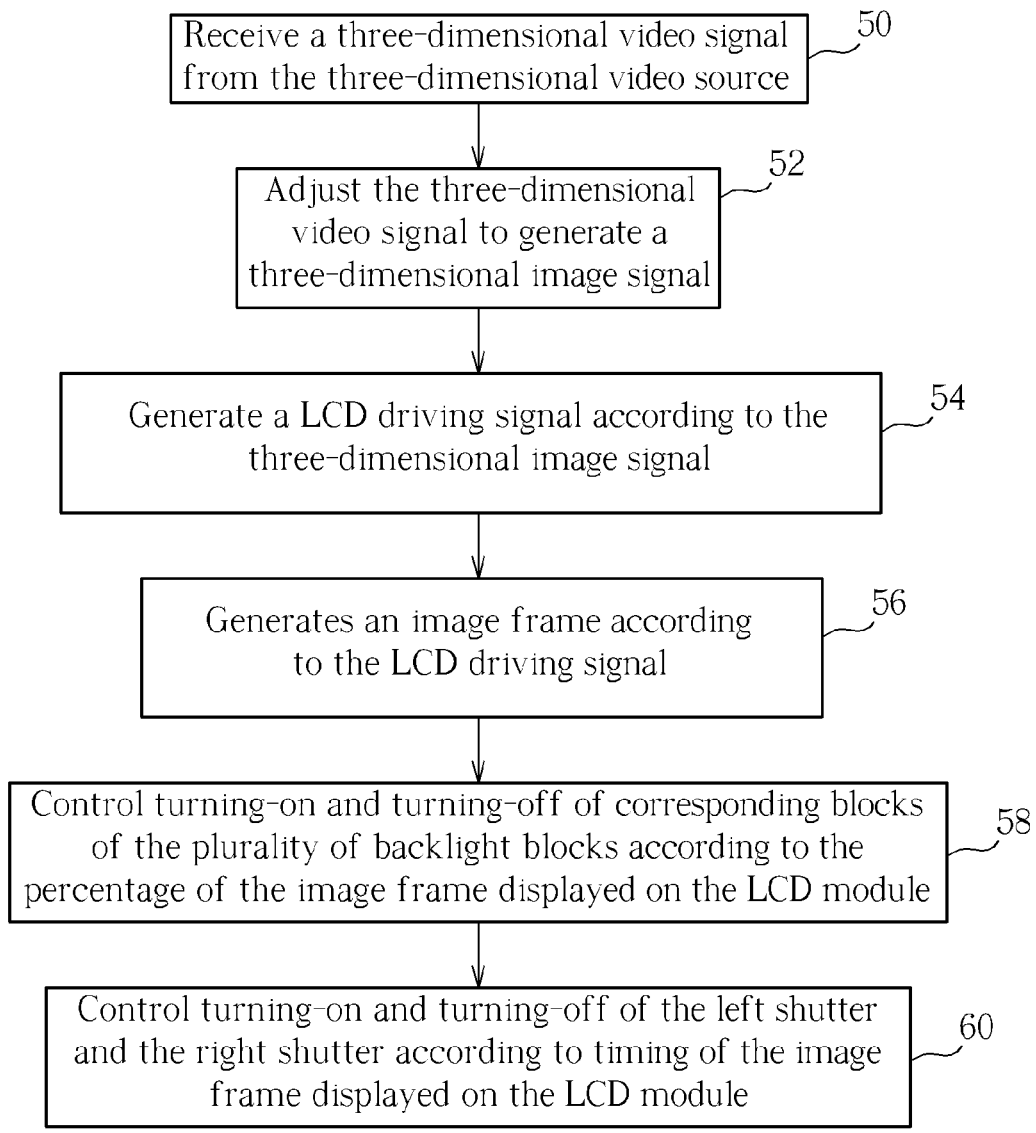
FIG. 5 is a flowchart illustrating a method for adjusting backlight to generate a three-dimensional image effect according to an embodiment of the present invention.

FIG. 5 is a flowchart illustrating a method for adjusting the backlight to generate a three-dimensional image effect according to another embodiment of the present invention. Detailed steps shown in FIG. 5 are as follows:

Step 50: The system control board 340 receives a three-dimensional video signal from the three-dimensional video source 360.

Step 52: The system control board 340 adjusts the three-dimensional video signal to generate a three-dimensional image signal.

Step 54: The LCD driving module 330 generates an LCD driving signal according to the three-dimensional image signal.

Step 56: The LCD panel 310 generates an image frame according to the LCD driving signal.

Step 58: The backlight driving module 320 controls turning-on and turning-off of corresponding blocks of the plurality of backlight blocks 390 through the first control signal according to percentage of the image frame displayed on the LCD panel 310.

Step 60: The shutter glasses 350 controls turning-on and turning-off of the left shutter and the right shutter through the second control signal according to timing of the image frame displayed on the LCD panel 310.

The method in FIG. 5 may further comprise another step. In the step, the second control signal may be generated according to a vertical sync signal of the LCD panel 310, and a period of the vertical sync signal of the LCD panel 310 may be the same as a period of the second control signal. In this situation, the first control signal is generated according to the second control signal. By making the first control signal synchronous with the second control signal, the backlight blocks 390 are substantially turned off when the left shutter and the right shutter of the pair of shutter glasses 350 are substantially switched.

Please refer to FIG. 6 through FIG. 10, which illustrate five embodiments of different first control signals used in combination with the LCD system 30 in FIG. 3 to realize the method shown in FIG. 5.

Figure 6:
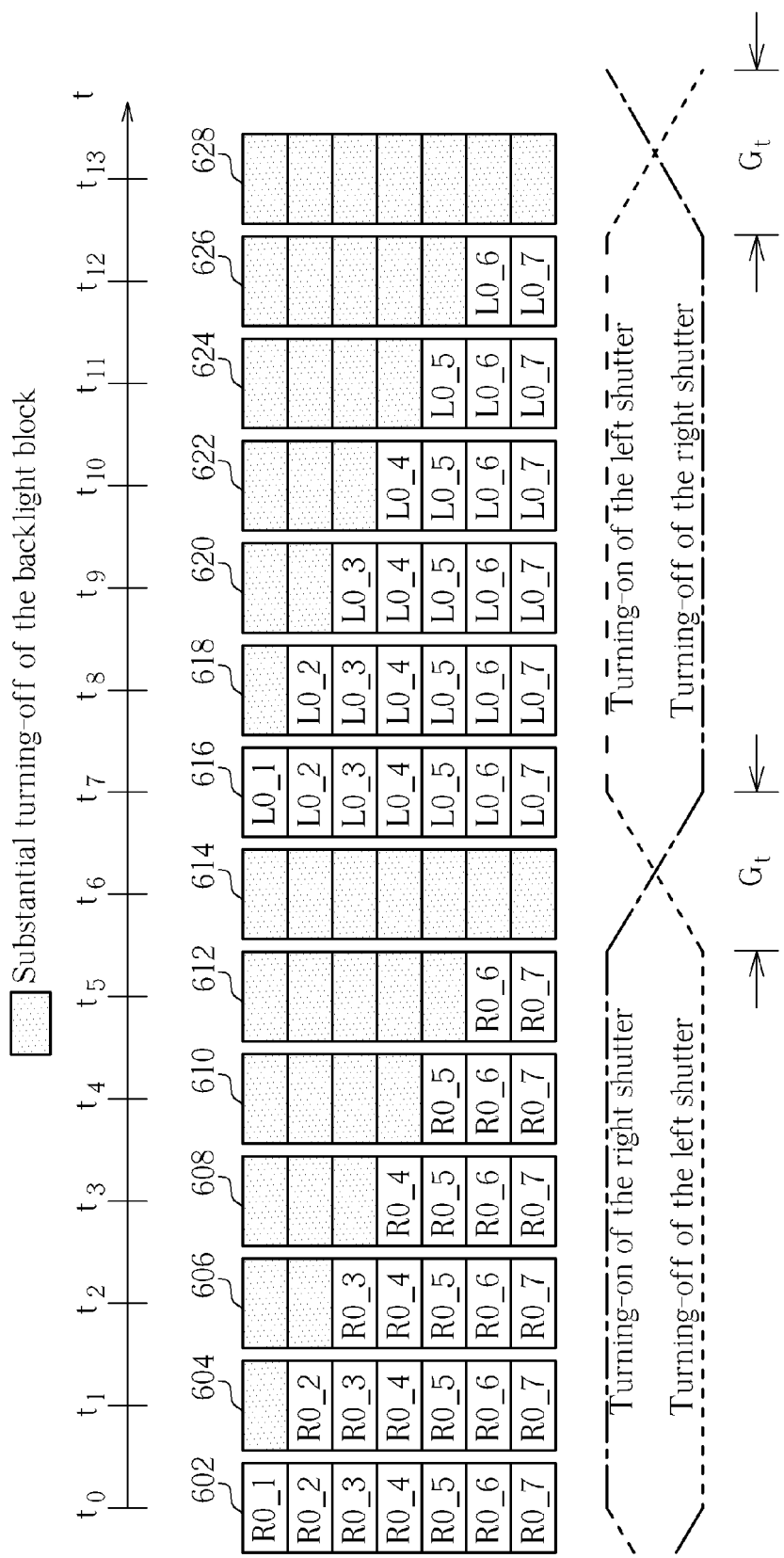
FIG. 6 is a timing diagram illustrating the method in FIG. 5 according to a second embodiment of the present invention.

FIG. 6 is a timing diagram illustrating the method shown in FIG. 5 according to a second embodiment of the present invention. In the embodiment of FIG. 6, the backlight module 300 may include seven backlight blocks 390 which may be controlled respectively. The second embodiment of the present invention is not limited to the backlight module having seven backlight blocks 390. In the second embodiment of the present invention, a switching time interval of the pair of shutter glasses 350 is assumed to be less than ½ the frame rate. At $t=t_0$, the LCD panel 310 displays the right eye image frame completely, the right shutter of the shutter glasses 350 is turned on, the left shutter of the shutter glasses 350 is turned off, and a frame 602 is displayed as the right eye image blocks R0_1-R0_7. Meanwhile, the backlight driving module 320 may substantially turn on the seven backlight blocks 390 corresponding to the right eye image blocks R0_1-R0_7 according to the first control signal. Then, the LCD panel 310 may start to output an LCD driving signal corresponding to a left eye image. At $t=t_1$, the LCD panel 310 may display a frame 604 shown in FIG. 6. The left eye image block L0_1 is displayed in the area corresponding to the top backlight block 390 of the seven backlight blocks 390, and the right eye image blocks R0_2-R0_7 are displayed in the areas corresponding to the rest of the seven backlight blocks 390. Because the right shutter is still turned on, the top backlight block 390 of the seven backlight blocks 390 may be substantially turned off according to the first control signal in order to prevent the left eye image block L0_1 causing interference in vision of a right eye of the user. Thus, the user may not see the left eye image block L0_1, but may substantially see the right eye image blocks R0_2-R0_7.

At t=$t_2$, the LCD panel 310 may display a frame 606. The left eye image blocks L0_1-L0_2 are displayed in the areas corresponding to the upper two backlight blocks 390 of the seven backlight blocks 390, and the right eye image blocks R0_3-R0_7 are displayed in the areas corresponding to the remaining five backlight blocks 390 of the seven backlight blocks 390. Because the right shutter may still be turned on, the upper two backlight blocks 390 of the seven backlight blocks 390 may be substantially turned off according to the first control signal in order to avoid the left eye image blocks L0_1-L0_2 interfering with the vision of the right eye. Thus, the user may not see the left eye image blocks L0_1-L0_2, but may see the right eye image blocks R0_3-R0_7 substantially. Similarly, at t=$t_3$, $t_4$, and $t_5$, the upper three, four, and five backlight blocks 390 of the seven backlight blocks 390 are turned off respectively according to the first control signal, so that the user may only see the right eye image blocks R0_4-R0_7, R0_5-R0_7, and R0_6-R0_7 respectively.

At t=$t_6$, the LCD panel 310 may display a frame 614. The left eye image blocks L0_1-L0_6 are displayed in the areas corresponding to the upper six backlight blocks 390 of the seven backlight blocks 390. During the time interval $t_6$-$t_7$, the pair of shutter glasses 350 may start to be switched, so as to turn off the right shutter and turn on the left shutter. So at t=$t_6$, the seven backlight blocks 390 may be turned off substantially according to the first control signal. However, the switching time interval of the pair of shutter glasses 350 may be longer according to another embodiment of the present invention. For example, the pair of shutter glasses 350 may start to be switched during the time interval of $t_5$-$t_6$. So at t=$t_5$, the seven backlight blocks 390 may be substantially turned off according to the first control signal.

At t=$t_7$, the pair of shutter glasses 350 has been switched, so the right shutter may be turned off and the left shutter turned on. Meanwhile, the LCD panel 310 may display a frame 616. The left eye image blocks L0_1-L0_7 are displayed in the areas corresponding to the seven backlight blocks 390. Because the left shutter is turned on, the seven backlight blocks 390 are turned on substantially according to the first control signal. At the time point, an LCD driving signal corresponding to the right eye image is inputted to the LCD panel 310. In addition, the operations of the LCD panel 310, the pair of shutter glasses 350, and the seven backlight blocks 390 during the time interval t8-t13 are the same as those during the time interval $t_1$-$t_5$. The only difference is that all operations are for the left eye of the user instead of the right eye of the user, so details will not be described in context again.

Figure 7:
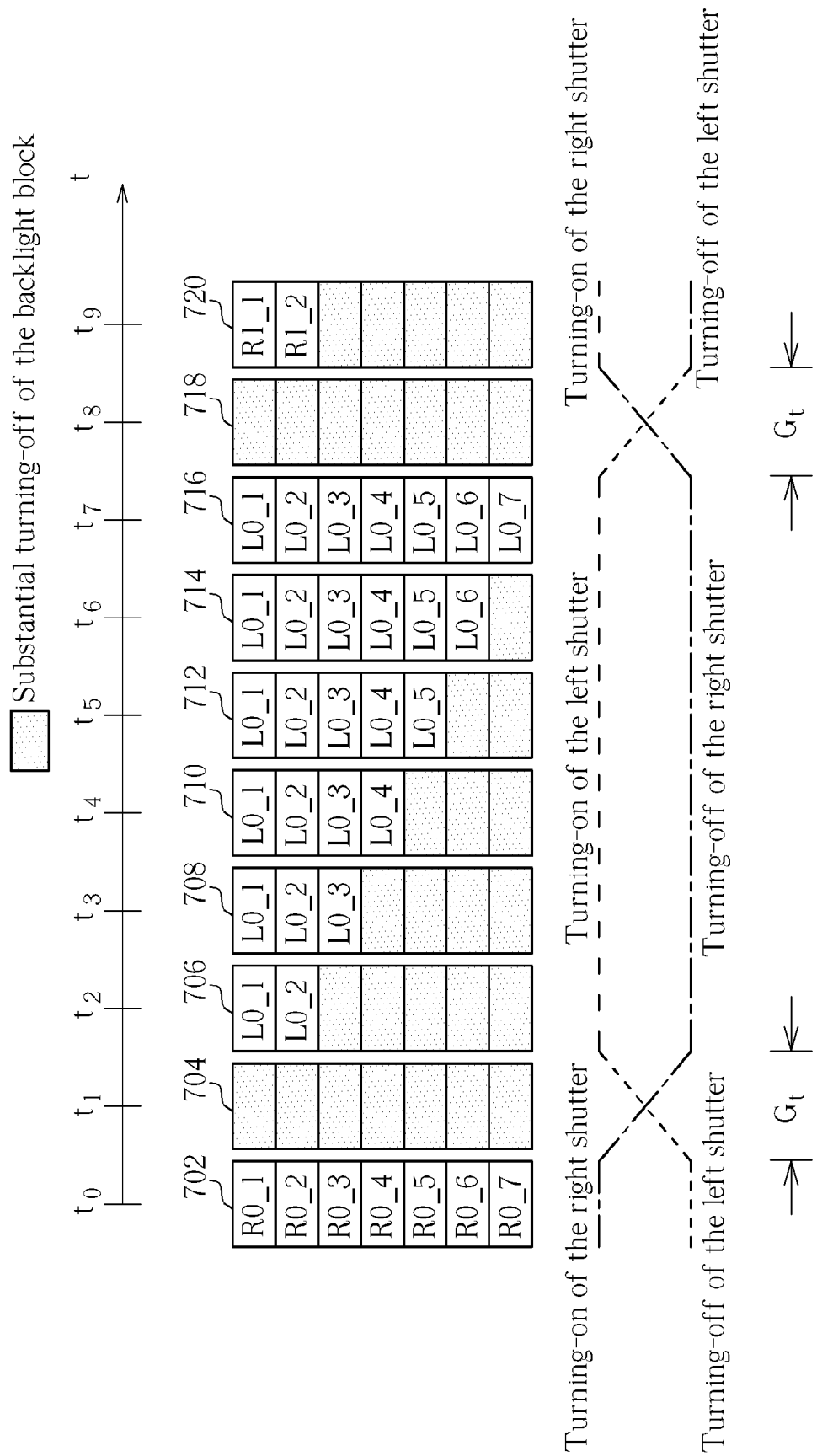
FIG. 7 is a timing diagram illustrating the method in FIG. 5 according to a third embodiment of the present invention.

FIG. 7 is a timing diagram illustrating the method shown in FIG. 5 according to a third embodiment of the present invention. As shown in FIG. 7, the backlight module 300 includes seven backlight blocks 390 which may be controlled respectively. The third embodiment of the present invention is not limited to the backlight module having seven backlight blocks 390. At t=$t_0$, a frame 702 is displayed as the right eye image blocks R0_1-R0_7. Meanwhile, an LCD driving signal corresponding to a left eye image is inputted to the LCD panel 310. In order to prevent left eye image blocks displayed on the LCD panel 310 from causing interference in the vision of the user, the pair of shutter glasses 350 may be switched during the time interval $t_0$-$t_1$ so that the left shutter may be turned on and the right shutter may be turned off. At t=$t_1$, the pair of shutter glasses 350 may be just switched and the seven backlight blocks 390 may be turned off according to the first control signal to avoid the images displayed on the LCD panel 310 interfering with the vision of the user as shown in frame 704.

At t=$t_2$, the LCD panel 310 may display a frame 706. The left eye image blocks L0_1-L0_2 are displayed in the areas corresponding to the upper two backlight blocks 390 of the seven backlight blocks 390, and the right eye image blocks R0_3-R0_7 are displayed in the areas corresponding to the remaining five backlight blocks 390 of the seven backlight blocks 390. Because the right shutter is still turned off, the upper two backlight blocks 390 of the seven backlight blocks 390 may be substantially turned on, and the remaining five backlight blocks 390 of the seven backlight blocks 390 may be substantially turned off according to the first control signal in order to avoid the right eye image blocks R0_3-R0_7 interfering with the vision of the left eye. Thus, the user may not see the right eye image blocks R0_3-R0_7, but may still see the left eye image blocks L0_1-L0_2 substantially. At t=$t_3$, the LCD panel 310 may display a frame 708. The left eye image blocks L0_1-L0_3 are displayed in the areas corresponding to the upper three backlight blocks 390 of the seven backlight blocks 390, and the right eye image blocks R0_4-R0_7 are displayed in the areas corresponding to the remaining four backlight blocks 390 of the seven backlight blocks 390. Because the right shutter is still turned off, the upper three backlight blocks 390 of the seven backlight blocks 390 are turned on substantially, and the remaining four backlight blocks 390 of the seven backlight blocks 390 may be substantially turned off according to the first control signal in order to prevent the right eye image blocks R0_4-R0_7 from causing interference in the vision of the left eye. Thus, the user may not see the right eye image blocks R0_4-R0_7, but may still see the left eye image blocks L0_1-L0_3 substantially. Similarly, at t=$t_4$, $t_5$, and $t_6$, the lower three, two, and one backlight blocks 390 of the seven backlight blocks 390 are turned off respectively according to the first control signal, so that the user may only see the left eye image blocks L0_1-L0_4, L0_1-L0_5, L0_1-L0_6 respectively. At t=$t_7$, the seven backlight blocks 390 of the seven backlight blocks 390 are turned on substantially according to the first control signal, so the user may see the left eye image blocks L0_1-L0_7.

During the time interval $t_7$-$t_8$, the shutter glasses 350 may start to be switched, so as to turn on the right shutter and turn off the left shutter. At t=$t_8$, the shutter glasses 350 may be just switched and the seven backlight blocks 390 may be turned off according to the first control signal to avoid the image displayed on the LCD panel 310 interfering with the vision of user as shown in frame 718. In addition, the operations of the LCD panel 310, the pair of shutter glasses 350, and the seven backlight blocks 390 at t=$t_9$ are the same as those at t=$t_2$, the only difference being that all operations are for the right eye of the user instead of the left eye of the user. Herein, further description is not repeated.

Figure 8:
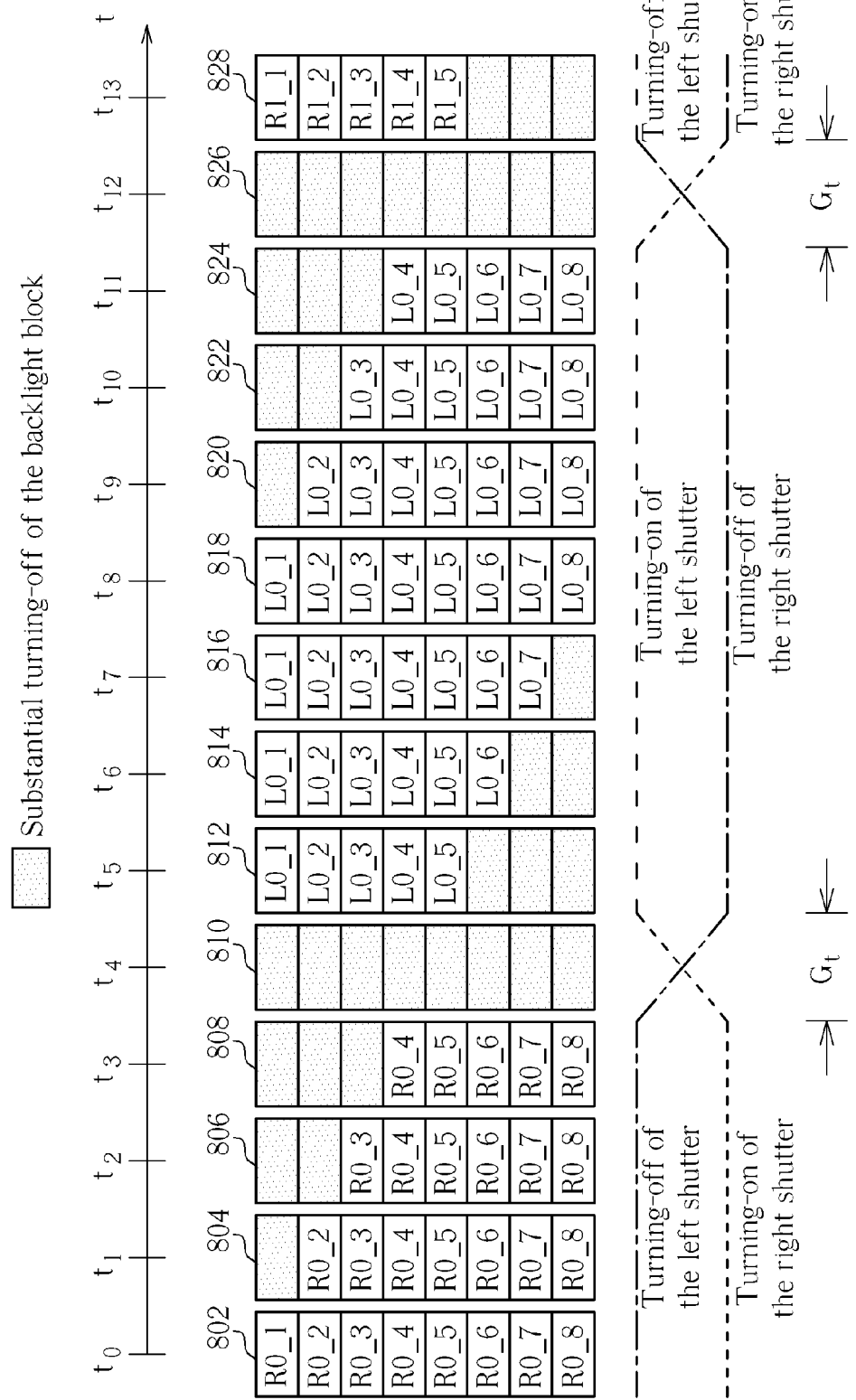
FIG. 8 is a timing diagram illustrating the method in FIG. 5 according to a fourth embodiment of the present invention.

FIG. 8 is a timing diagram illustrating the method shown in FIG. 5 according to a fourth embodiment of the present invention. As shown in FIG. 8, the backlight module 300 includes eight backlight blocks 390 which may be controlled respectively, but the fourth embodiment of the present invention is not limited to the backlight module having eight backlight blocks 390. At t=$t_0$, the right shutter of the shutter glasses 350 may be turned on, the left shutter of the shutter glasses 350 may be turned off, and a frame 802 is displayed as the right eye image blocks R0_1-R0_8. Because the right shutter may be turned on, the eight backlight blocks 390 may be turned on substantially according to the first control signal, and an LCD driving signal corresponding to a left eye image is inputted to the LCD panel 310 at the time point. At t=$t_1$, the LCD panel 310 may display a frame 804. The left eye image block L0_1 is displayed in the area corresponding to an upper backlight block 390 of the eight backlight blocks 390, and the right eye image blocks R0_2-R0_8 are displayed in the areas corresponding to the rest of the eight backlight blocks 390. Because the right shutter is still turned on, the upper backlight block 390 of the eight backlight blocks 390 may be turned off substantially according to the first control signal in order to avoid the left eye image block L0_1 interfering with the vision of the right eye. Thus, the user may not see the left eye image block L0_1, but may still see the right eye image blocks R0_2-R0_8 substantially.

At $t=t_2$, the LCD panel 310 may display a frame 806. The left eye image blocks L0_1-L0_2 are displayed in the areas corresponding to the upper two backlight blocks 390 of the eight backlight blocks 390, and the right eye image blocks R0_3-R0_8 are displayed in the areas corresponding to the remaining six backlight blocks 390 of the eight backlight blocks 390. Because the right shutter may still be turned on, the upper two backlight blocks 390 of the eight backlight blocks 390 may be turned off substantially according to the first control signal in order to prevent the left eye image blocks L0_1-L0_2 from causing interference in the vision of the right eye. Thus, the user may not see the left eye image blocks L0_1-L0_2, but may still see the right eye image blocks R0_3-R0_8 substantially. Similarly, at $t=t_3$, the upper three backlight blocks 390 of the 8 backlight blocks 390 may be turned off substantially according to the first control signal, so that the user may only see the right eye image blocks R0_4-R0_8.

At $t=t_4$, the LCD panel 310 may display a frame 810. The left eye image blocks L0_1-L0_4 are displayed in the areas corresponding to the upper four backlight blocks 390 of the eight backlight blocks 390. During the time interval $t_3$-$t_4$, the pair of shutter glasses 350 starts to be switched so as to turn off the right shutter and turn on the left shutter. However, the pair of shutter glasses 350 can also start to be switched at $t=t_4$ so as to turn off the right shutter and turn on the left shutter. At $t=t_4$, the pair of shutter glasses 350 may be just switched or starting to be switched, and the eight backlight blocks 390 may be turned off according to the first control signal to avoid the images displayed on the LCD panel 310 interfering with the vision of the user as shown in frame 810.

At $t=t_5$, the LCD panel 310 displays a frame 812. The left eye image blocks L0_1-L0_5 will be displayed in the areas corresponding to the upper five backlight blocks 390 of the eight backlight blocks 390, and the right eye image blocks R0_6-R0_8 will be displayed in the areas corresponding to the remaining three backlight blocks 390 of the eight backlight blocks 390. Because the right shutter is turned off and the left shutter is turned on, the upper five backlight blocks 390 of the eight backlight blocks 390 are turned on substantially and the remaining three backlight blocks 390 of the eight backlight blocks 390 may be turned off substantially according to the first control signal in order to avoid the right eye image blocks R0_6-R0_8 interfering with the vision of the left eye. Thus, the user may not see the right eye image blocks R0_6-R0_8, but may still see the left eye image blocks L0_1-L0_5 substantially. At $t=t_6$, the LCD panel 310 may display a frame 814. The left eye image blocks L0_1-L0_6 are displayed in the areas corresponding to the upper six backlight blocks 390 of the eight backlight blocks 390, and the right eye image blocks R0_7-R0_8 are displayed in the areas corresponding to the remaining two backlight blocks 390 of the eight backlight blocks 390. Because the right shutter is turned off and the left shutter is turned on, the upper six backlight blocks 390 of the eight backlight blocks 390 may be turned on substantially, and the remaining two backlight blocks 390 of the eight backlight blocks 390 may be turned off substantially according to the first control signal in order to avoid the right eye image blocks R0_7-R0_8 interfering with the vision of the left eye. Thus, the user may not see the right eye image blocks R0_7-R0_8, but may still see the left eye image blocks L0_1-L0_6 substantially. Similarly, at $t=t_7$, a bottom backlight block 390 of the eight backlight blocks 390 may be turned off substantially according to the first control signal, so that the user may only see the left eye image blocks L0_1-L0_7. At $t=t_8$, the eight backlight blocks 390 are turned on substantially according to the first control signal, so that the user may only see the left eye image blocks L0_1-L0_8. In addition, the operations of the LCD panel 310, the pair of shutter glasses 350, and the eight backlight blocks 390 at a time interval $t_9$-$t_{13}$ are the same as those during the time interval $t_1$-$t_5$, the only difference being that all operations are for the right eye of the user instead of the left eye of the user. Herein, further description will not be repeated.

Figure 9:
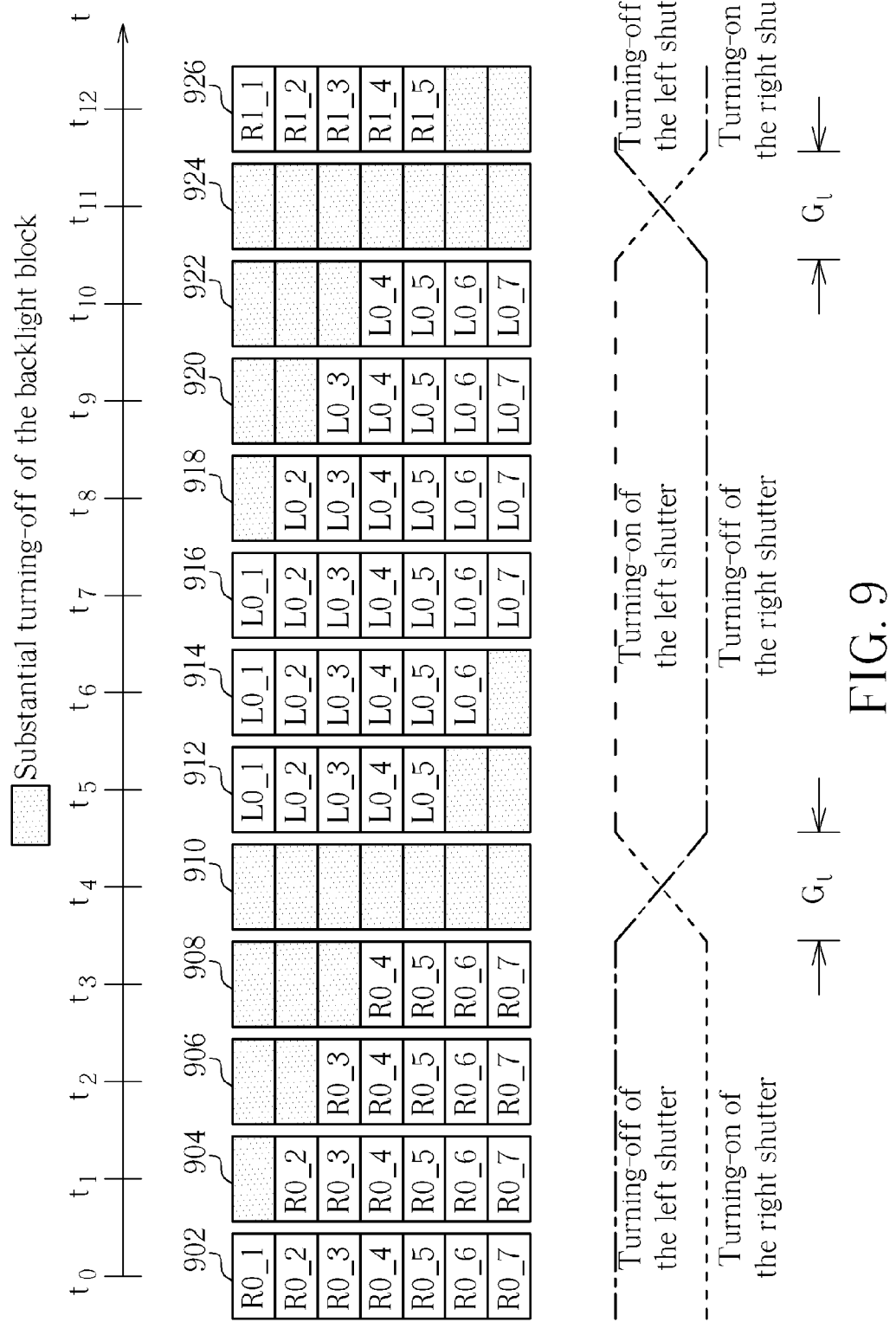
FIG. 9 is a timing diagram illustrating the method in FIG. 5 according to a fifth embodiment of the present invention.

FIG. 9 is a timing diagram illustrating the method in FIG. 5 according to a fifth embodiment of the present invention. A difference between the fifth embodiment and the fourth embodiment is that the backlight module 300 includes seven backlight blocks 390 which may be controlled respectively, not eight backlight blocks 390.

Figure 10:
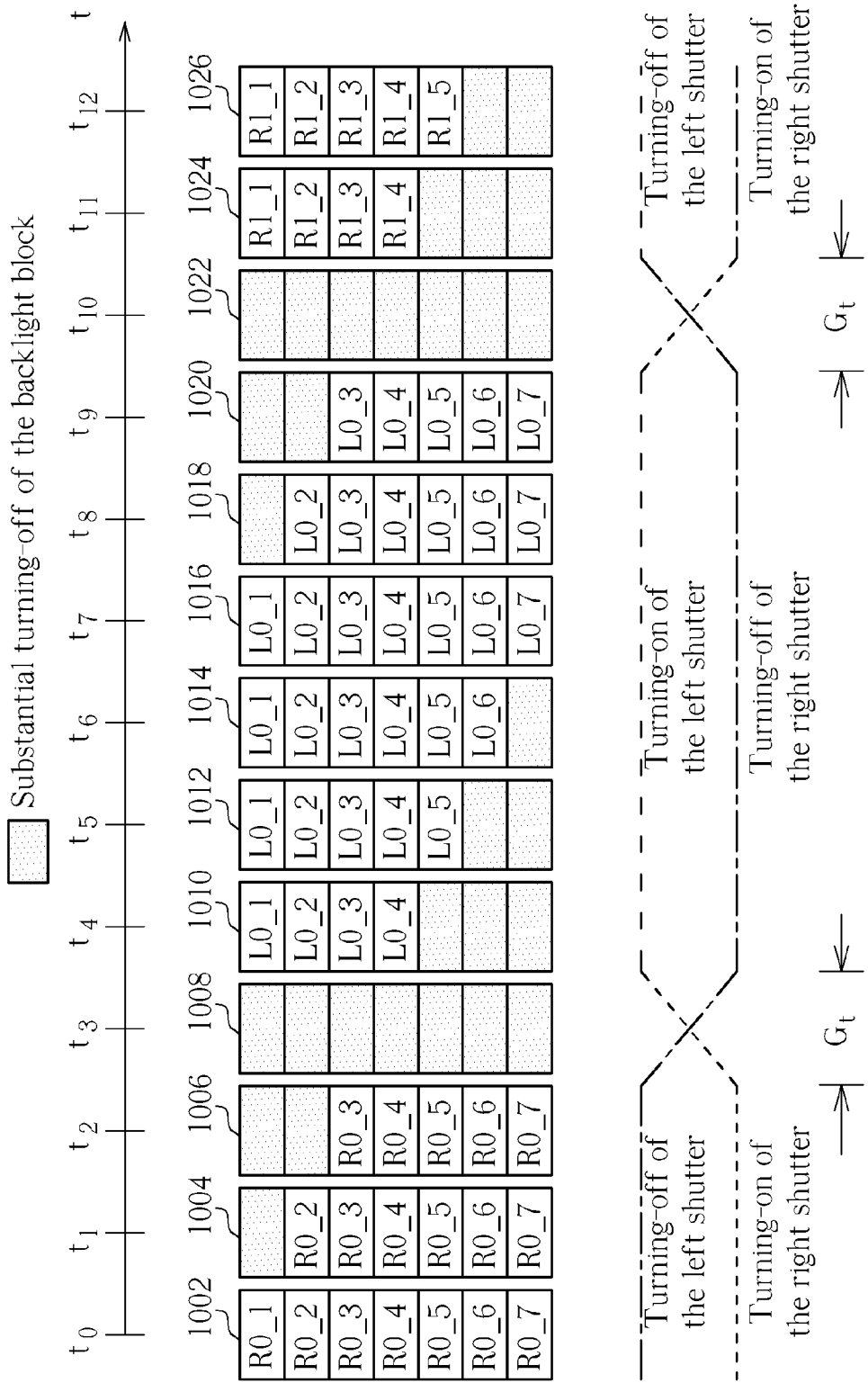
FIG. 10 is a timing diagram illustrating the method in FIG. 5 according to a sixth embodiment of the present invention.

FIG. 10 is a timing diagram illustrating the method in FIG. 5 according to a sixth embodiment of the present invention. A difference between the fifth embodiment and the sixth embodiment is that a switching time point of the shutter glasses 350 in FIG. 10 may be earlier than that in FIG. 9. Therefore, an upper region of the frame may be brighter than a lower region of the frame as shown in FIG. 10, and a lower region of the frame may be brighter than an upper region of the frame as shown in FIG. 9.

To sum up, in the embodiments of FIG. 6, FIG. 7, FIG. 8, FIG. 9, and FIG. 10, the backlight driving module 320 drives the plurality of backlight blocks 390 step by step according to the first control signal, and the pair of shutter glasses 350 controls turning-on and turning-off of the left shutter and the right shutter according to the second control signal. Therefore, the embodiments may not require black frames, but can still avoid the right eye images interfering with the vision of the left eye and the left eye images interfering with the vision of the right eye effectively. In addition, the embodiments may also save power through turning off the plurality of backlight blocks 390 substantially.

Those skilled in the art will readily observe that numerous modifications and alterations of the device and method may be made while retaining the teachings of the invention.

What is claimed is:

1. A liquid crystal display (LCD) system for generating a three-dimensional image effect by adjusting a backlight, the liquid crystal display system comprising:
  a backlight module comprising a plurality of backlight blocks;
  a system control board, generating a first control signal and a second control signal, and generating a three-dimensional image signal according to a three-dimensional video signal from a three-dimensional video source;
  an LCD driving module coupled to the system control board, adjusting a timing of the three-dimensional image signal and outputting an LCD driving signal;
  an LCD panel installed on the backlight module and coupled to the LCD driving module, receiving the LCD driving signal to generate an image frame;
  a backlight driving module coupled to the plurality of backlight blocks and the system control board, controlling turning-on and turning-off of corresponding blocks of the plurality of backlight blocks according to the first control signal; and a pair of shutter glasses comprising a left shutter and a right shutter to be turned on and turned off according to the second control signal;

wherein the first control signal and the second control signal relate to a percentage of the image frame displayed on the LCD panel, and a number of backlight blocks turned on and off at one time is directly related to the percentage of the image frame displayed on the LCD panel at that time.

2. A method for adjusting a backlight to generate a three-dimensional image effect, the method comprising:

generating an image frame on a liquid crystal display (LCD) panel according to a three-dimensional video signal;

controlling turning-on and turning-off of corresponding blocks of a plurality of backlight blocks according to a percentage of the image frame displayed on the LCD panel; and controlling turning-on and turning-off of a left shutter and a right shutter of a pair of shutter glasses according to a timing of the image frame displayed on the LCD panel;

wherein the plurality of backlight blocks are all turned off when the left shutter and the right shutter are switched, and a number of backlight blocks turned on and off at one time is directly related to the percentage of the image frame displayed on the LCD panel at that time.

3. The method of claim 2, wherein the plurality of backlight blocks comprises N backlight blocks, and controlling turning-on and turning-off of the corresponding blocks of the plurality of backlight blocks according to the percentage of the image frame displayed on the LCD panel comprises:

turning on k backlight blocks of the N backlight blocks when the LCD panel has outputted $(k-1)/N$ of a right eye image frame; and turning off the N backlight blocks when the LCD panel has outputted the right eye image frame completely;

wherein $N \geq k \geq 2$.

4. The method of claim 3, wherein controlling turning-on and turning-off of the left shutter and the right shutter of the pair of shutter glasses according to the timing of the image frame displayed on the LCD panel comprises:

controlling the pair of shutter glasses to start switching to turn on the left shutter and turn off the right shutter when the LCD panel has outputted the right eye image frame completely.

5. The method of claim 2, wherein the plurality of backlight blocks comprises N backlight blocks, and controlling turning-on and turning-off of the corresponding blocks of the plurality of backlight blocks according to the percentage of the image frame displayed on the LCD panel comprises:

turning off k backlight blocks of the N backlight blocks when the LCD panel has outputted $k/N$ of a right eye image frame;

turning off the N backlight blocks when the LCD panel has outputted $(N-1)/N$ of the right eye image frame; and turning on the N backlight blocks when the LCD panel has outputted the right eye image frame completely;

wherein $(N-2) \geq k \geq 1$.

6. The method of claim 5, wherein controlling turning-on and turning-off of the left shutter and the right shutter of the pair of shutter glasses according to the timing of the image frame displayed on the LCD panel comprises:

turning off the right shutter and turning on the left shutter when the right eye image frame starts to be outputted.

7. The method of claim 2, wherein the plurality of backlight blocks comprises N backlight blocks, and controlling turning-on and turning-off of the corresponding blocks of the plurality of backlight blocks according to the percentage of the image frame displayed on the LCD panel comprises:

turning off the N backlight blocks when the LCD panel has outputted $1/N$ of a right eye image frame; and turning on k backlight blocks of the N backlight blocks when the LCD panel has outputted $k/N$ of the right eye image frame;

wherein $N \geq k \geq 2$.

8. The method of claim 7, wherein controlling turning-on and turning-off of the left shutter and the right shutter of the pair of shutter glasses according to the timing of the image frame displayed on the LCD panel comprises:

controlling the pair of shutter glasses to start switching to turn on the right shutter and turn off the left shutter during a period from the LCD panel starting to output the right eye image frame to the LCD panel having outputted $1/N$ of the right eye image frame.

9. The method of claim 2, wherein the plurality of backlight blocks comprises N backlight blocks, and controlling turning-on and turning-off of the corresponding blocks of the plurality of backlight blocks according to the percentage of the image frame displayed on the LCD panel comprises:

turning off $(N/2-i)$ backlight blocks of the N backlight blocks when the LCD panel has outputted $(N-2i)/2N$ of a right eye image frame;

turning off the N backlight blocks when the LCD panel has outputted $\frac{1}{2}$ of the right eye image frame; and turning on $(j+N/2)$ backlight blocks of the N backlight blocks when the LCD panel has outputted $(N+2j)/2N$ of the right eye image frame;

wherein $(N/2-i) \geq i \geq 1$, and $N/2 \geq j \geq 1$.

10. The method of claim 9, wherein controlling turning-on and turning-off of the left shutter and the right shutter of the shutter glasses according to the timing of the image frame displayed on the LCD panel comprises:

controlling the pair of shutter glasses to start switching to turn on the right shutter and turn off the left shutter through the second control signal when the LCD panel has outputted $(N-2)/2N$ of the right eye image frame.

11. The method of claim 2, wherein the plurality of backlight blocks comprises N backlight blocks, and controlling turning-on and turning-off of the left shutter and the right shutter of the shutter glasses according to the timing of the image frame displayed on the LCD panel comprises:

turning off i backlight blocks of the N backlight blocks when the LCD panel has outputted $i/N$ of a right eye image frame;

turning off the N backlight blocks when the LCD panel has outputted $(N+1)/2N$ of the right eye image frame; and turning on j backlight blocks when the LCD panel has outputted $j/N$ of the right eye image frame;

wherein $(N-1)/2 \geq i \geq 1$, and $N \geq j \geq (N+3)/2$.

12. The method of claim 11, wherein controlling turning-on and turning-off of the left shutter and the right shutter of the shutter glasses according to the timing of the image frame displayed on the LCD panel comprises:

controlling the pair of shutter glasses to start switching to turn on the right shutter and turn off the left shutter when the LCD panel has outputted $(N-2)/2N$ of the right eye image frame.

13. The method of claim 2, wherein the plurality of backlight blocks comprises N backlight blocks, and controlling turning-on and turning-off of the left shutter and the right shutter of the shutter glasses according to the timing of the image frame displayed on the LCD panel comprises:

turning off i backlight blocks of the N backlight blocks when the LCD panel has outputted i/N of a right eye image frame;

turning off the N backlight blocks when the LCD panel has outputted (N+1)/2N of the right eye image frame; and turning on j backlight blocks when the LCD panel has outputted j/N of the right eye image frame;

wherein $(N-3)/2 \geq i \geq 1$, and $N \geq j \geq (N+1)/2$.

14. The method of claim 13, wherein controlling turning-on and turning-off of the left shutter and the right shutter of the shutter glasses according to the timing of the image frame displayed on the LCD panel comprises:

controlling the pair of shutter glasses to start switching to turn on the right shutter and turn off the left shutter when the LCD panel has outputted $(N-3)/2N$ of the right eye image frame.

15. The method of claim 2, wherein controlling turning-on and turning-off of the left shutter and the right shutter of the pair of shutter glasses according to the timing of the image frame displayed on the LCD panel comprises controlling turning-on and turning-off of the corresponding blocks of the plurality of backlight blocks periodically according to the percentage of the image frame displayed on the LCD panel, and controlling turning-on and turning-off of the left shutter and the right shutter of the pair of shutter glasses according to the timing of the image frame displayed on the LCD panel comprises controlling turning-on and turning-off of the left shutter and the right shutter of the pair of shutter glasses periodically according to the timing of the image frame displayed on the LCD panel.

* * * * *